United States Patent
Hickey et al.

(10) Patent No.: US 8,000,987 B2
(45) Date of Patent: Aug. 16, 2011

(54) QUALITY MODEL CERTIFICATION ASSESSMENT COST ESTIMATION AND OPTIMIZATION

(75) Inventors: Donna M. Hickey, Longmont, CO (US); Randy S. Johnson, Ofallon, MO (US); Shelby J. Lassiter, Odessa, FL (US); Gregory Merkel, Mechanicsburg, PA (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 11/839,416

(22) Filed: Aug. 15, 2007

(65) Prior Publication Data

US 2009/0048895 A1 Feb. 19, 2009

(51) Int. Cl.
*G06Q 10/00* (2006.01)
(52) U.S. Cl. ........................................... 705/6
(58) Field of Classification Search ................. None
See application file for complete search history.

(56) References Cited

U.S. PATENT DOCUMENTS

| | | | |
|---|---|---|---|
| 5,063,506 A * | 11/1991 | Brockwell et al. | 705/7 |
| 6,862,696 B1 * | 3/2005 | Voas et al. | 714/38 |
| 2002/0059512 A1 * | 5/2002 | Desjardins | 713/1 |
| 2003/0074242 A1 * | 4/2003 | MacRae et al. | 705/7 |
| 2005/0021380 A1 | 1/2005 | Taylor | |
| 2005/0171918 A1 | 8/2005 | Eden et al. | |
| 2006/0106658 A1 * | 5/2006 | Johanson et al. | 705/7 |
| 2006/0161444 A1 | 7/2006 | Lubrecht et al. | |
| 2006/0282276 A1 | 12/2006 | Venzon et al. | |

OTHER PUBLICATIONS

Mark Keil and Ramiro Montealegre, "currting your losses: extricating your organization when a big project goes away" Sloan Management Review, Spring 2000, http://www.emory.edu/BUSINESS/readings/keil-SMR00.pdf, retrieved Oct. 29, 2010.*

* cited by examiner

*Primary Examiner* — John W Hayes
*Assistant Examiner* — George Chen
(74) *Attorney, Agent, or Firm* — John Pivnichny; Roberts Mlotkowski Safran & Cole, P.C.

(57) ABSTRACT

A method includes determining a standard set of activities to perform an assessment and certification process, and identifying cost elements and cost drivers for each activity of the standard set of activities. Additionally, the method includes determining requirements for a particular assessment and certification project, and determining a cost estimation based upon at least one of the standard set of activities, the cost elements, the cost drivers, and the requirements.

19 Claims, 12 Drawing Sheets

| Assumptions: | Inputs | Comments |
|---|---|---|
| Location of Junior Internal Auditor and Senior Internal Auditor (Country) | Int Eval Team Country | Junior Internal Auditor and Senior Internal Auditor come from Int Eval Team Country |
| Local Currency of Junior Internal Auditor and Senior Internal Auditor (Int Eval Team Country) | Int Eval Team Currency | Local currency for Junior Internal Auditor and Senior Internal Auditor and into which costs will be converted is Int Eval Team Currency |
| Type of Audit | Quality Model | Quality Model audit |
| Location of Quality Model Audit (Country) | Audit Country | Quality Model Audit is in Audit Country |
| Local Currency of Quality Model Audit (Audit Country) | Audit Currency | Local currency for the Quality Model audit is Audit Currency |
| Exchange Rate of Quality Model Audit (Audit Country) | 1.5000 | 1.5 Audit Currency per Int Eval Team Currency |
| Location of External Auditor and External Lead Auditor (Country) | Ext Eval Team Country | External Auditor and External Lead Auditor are coming from Ext Eval Team Country |
| Local Currency of External Auditor and External Lead Auditor (Ext Eval Team Country) | Ext Eval Team Currency | Local currency is Ext Eval Team Currency |
| Exchange Rate of External Auditor and External Lead Auditor (Ext Eval Team Country) | 2.0000 | 2 Ext Eval Team Currency per Int Eval Team Currency |
| Title of Junior Internal Auditor | Junior Internal Auditor | The Title of Junior Internal Auditor is Junior Internal Auditor. |
| Title of Senior Internal Auditor | Senior Internal Auditor | The Title of Senior Internal Auditor is Senior Internal Auditor. |
| Title of External Auditor | External Auditor | The Title of External Auditor is External Auditor. |
| Title of External Lead Auditor | External Lead Auditor | The Title of External Lead Auditor is External Lead Auditor. |
| Hourly Internal Audit Country Labor cost | 0.00 | 0 Int Eval Team Currency per hour. |
| Hourly Cost of Junior Internal Auditor | 0.00 | 0 Int Eval Team Currency per hour. |
| Hourly Cost of Senior Internal Auditor | 0.00 | 0 Int Eval Team Currency per hour. |
| Hourly Cost of Junior Internal Auditor and Senior Internal Auditor Management Overhead | 0.00 | 0 Int Eval Team Currency per hour. |
| Daily cost per External Lead Auditor | 0.00 | 0 Int Eval Team Currency per day. |
| Daily cost per External Auditor | 0.00 | 0 Int Eval Team Currency per day. |
| Roundtrip airfare - business class | 0.00 | 0 Int Eval Team Currency per roundtrip airfare business class from Int Eval Team Country to Audit Country |
| Junior Internal Auditor and Senior Internal Auditor per diem | 0.00 | 0 Int Eval Team Currency per diem (Int Eval Team Country) |
| External Auditor and External Lead Auditor Roundtrip Airfare in local currency (Ext Eval Team Country) | 0.00 | 0 Int Eval Team Currency per roundtrip airfare from Ext Eval Team Country to Audit Country |
| External Auditor and External Lead Auditor per Diem in local currency (Ext Eval Team Country) | 0.00 | 0 Int Eval Team Currency per diem (Ext Eval Team Country) |
| Quality Model certification fee | 0 | 0 Int Eval Team Currency Quality Model |

Figure 3

| Assumptions: | Inputs | Comments |
|---|---|---|
| Week(s) of Consulting / Implementation Assistance by one Int Eval Team Country Senior Internal Auditor. This includes assistance on any documentation / Quality Management System mapping to the Quality Model model. | 0.00 | 0 Week(s) of Consulting / Implementation Assistance by one Int Eval Team Country Senior Internal Auditor. This includes assistance on any documentation / Quality Management System mapping to the Quality Model model. |
| Hour(s) of Planning for Internal Audit | 0.00 | 0 Hour(s) of Planning for Internal Audit |
| Week(s) of Preparation for Internal Audit | 0.00 | 0 Week(s) of Preparation for Internal Audit |
| Week(s) of Assessment for Internal Audit | 0.00 | 0 Week(s) of Assessment for Internal Audit |

Figure 4

| Assumptions: | Inputs | Comments |
|---|---|---|
| Int Eval Team Country JUNIOR INTERNAL AUDITOR AND SENIOR INTERNAL AUDITOR LABOR ASSUMPTIONS: | | |
| Additional day(s) (e.g., travel) per Int Eval Team Country Junior Internal Auditor and Senior Internal Auditor for Internal Audit | 0.00 | 0 Additional day(s) (e.g., travel) per Int Eval Team Country Junior Internal Auditor and Senior Internal Auditor for Internal Audit |
| Hour(s) per week per Int Eval Team Country Junior Internal Auditor(s) and Senior Internal Auditor(s) for Internal Audit activities | 0.00 | 0 Hour(s) per week per Int Eval Team Country Junior Internal Auditor(s) and Senior Internal Auditor(s) for Internal Audit activities |
| Hour(s) per week for Int Eval Team Country management support for Internal Audit activities | 0.00 | 0 Hour(s) per week for Int Eval Team Country management support for Internal Audit activities |
| Int Eval Team Country Junior Internal Auditor(s) performing Internal Audit activities | 0.00 | 0 Int Eval Team Country Junior Internal Auditor(s) performing Internal Audit activities |
| Int Eval Team Country Senior Internal Auditor(s) performing Internal Audit activities | 0.00 | 0 Int Eval Team Country Senior Internal Auditor(s) performing Internal Audit activities |
| SITE LABOR ASSUMPTIONS: | | |
| Number of Internal Audit Country personnel providing assistance during Internal Audit | 0.00 | 0 Number of Internal Audit Country personnel providing assistance during Internal Audit |
| Hours per week for Internal Audit Country personnel providing assistance during Internal Audit | 40.00 | 40 Hours per week for Internal Audit Country personnel providing assistance during Internal Audit |

Figure 5

| Assumptions: | Inputs | Comments |
|---|---|---|
| Day(s) to project plan by the External Lead Auditor | 0.00 | 0 Day(s) to project plan by the External Lead Auditor |
| Day(s) on-site pre-audit by the External Lead Auditor | 0.00 | 0 Day(s) on-site pre-audit by the External Lead Auditor |
| Week(s) per Int Eval Team Country Senior Internal Auditor consulting during External Audit | 0.00 | 0 Week(s) per Int Eval Team Country Senior Internal Auditor consulting during External Audit |
| Week(s) for External Audit | 0.00 | 0 Week(s) for External Audit |

Figure 6

| Assumptions: | Inputs | Comments |
|---|---|---|
| Int Eval Team Country SENIOR INTERNAL AUDITOR LABOR ASSUMPTIONS: | | |
| Additional day(s) (e.g., travel) per Int Eval Team Country Senior Internal Auditor consulting | 0.00 | 0 Additional day(s) (e.g., travel) per Int Eval Team Country Senior Internal Auditor consulting |
| Hour(s) per week per Int Eval Team Country Senior Internal Auditor for consulting during External Audit | 0.00 | 0 Hour(s) per week per Int Eval Team Country Senior Internal Auditor for consulting during External Audit |
| Hour(s) per week for Int Eval Team Country management support for External Audit activities | 0.00 | 0 Hour(s) per week for Int Eval Team Country management support for External Audit activities |
| Int Eval Team Country Senior Internal Auditor(s) performing External Audit activities | 0.00 | 0 Int Eval Team Country Senior Internal Auditor(s) performing External Audit activities |
| SITE LABOR ASSUMPTIONS: | | |
| Internal Audit Country personnel providing assistance during pre-audit | 0.00 | 0 Internal Audit Country personnel providing assistance during pre-audit |
| Internal Audit Country personnel providing assistance during audit | 0.00 | 0 Internal Audit Country personnel providing assistance during audit |
| Hour(s) per week for Internal Audit Country personnel providing assistance during Pre-External Audit | 0.00 | 0 Hour(s) per week for Internal Audit Country personnel providing assistance during Pre-External Audit |
| Hour(s) per week for Internal Audit Country personnel providing assistance during External Audit | 0.00 | 0 Hour(s) per week for Internal Audit Country personnel providing assistance during External Audit |
| EXTERNAL AUDITOR AND EXTERNAL LEAD AUDITOR LABOR ASSUMPTIONS: | | |
| Additional day(s) (e.g., travel) for External Lead Auditor on-site | 0.00 | 0 Additional day(s) (e.g., travel) for External Lead Auditor on-site |
| External Auditor(s) performing External Audit activities | 0.00 | 0 External Auditor(s) performing External Audit activities |
| Roundtrip(s) per External Auditor and External Lead Auditor. -1 roundtrip(s) in the middle of the External Audit. | 0.00 | 0 Roundtrip(s) per External Auditor and External Lead Auditor. -1 roundtrip(s) in the middle of the External Audit. |

Figure 7

| Internal Preparation and Pilot Factors | Estimate Comments | Cost | Notes |
|---|---|---|---|
| Management oversight | 0 weeks for management oversight. | 0 | Int Eval Team Country Management = 0 Int Eval Team Currency / hour. 0 hour week. |
| Internal consulting / implementation assistance | 0 Week(s) of Consulting / Implementation Assistance by one Int Eval Team Country Senior Internal Auditor. This includes assistance on any documentation / Quality Management System mapping to the Quality Model model. | 0 | Int Eval Team Country Senior Internal Auditor = 0 Int Eval Team Currency / hour. 0 hour week. |
| Junior Internal Auditor and Senior Internal Auditor Internal Audit labor | 0 Int Eval Team Country Junior Internal Auditor(s). 0 Int Eval Team Country Senior Internal Auditor(s). 0 weeks for Internal Audit; 0 Week(s) of Preparation for Internal Audit and 0 Week(s) of Assessment for Internal Audit. 0 Hour(s) of Planning for Internal Audit. | 0 | Junior Internal Auditor = 0 Int Eval Team Currency / hour. Senior Internal Auditor = 0 Int Eval Team Currency / hour. 0 hour week. |
| Internal assistance during Internal Audit | 0 Number of Internal Audit Country personnel providing assistance during Internal Audit. 0 weeks. | 0 | 40 hour week. 0 Int Eval Team Currency per hour. 1.5 Audit Currency to 1 Int Eval Team Currency exchange rate. |
| Internal consulting / implementation assistance travel airfare | Roundtrip airfare from Int Eval Team Country to Audit Country for one Int Eval Team Country Senior Internal Auditor providing internal consulting / implementation assistance. | 0 | 0 Int Eval Team Currency per roundtrip airfaire from Int Eval Team Country to Audit Country. |
| Internal consulting / implementation assistance per diem | 0 days for one Int Eval Team Country Senior Internal Auditor providing internal consulting / implementation assistance. | 0 | 0 Int Eval Team Currency per diem (Int Eval Team Country) |
| Internal Audit travel - airfare | Roundtrip airfare from Int Eval Team Country to Audit Country for 0 Int Eval Team Country Junior Internal Auditor(s) and 0 Int Eval Team Country Senior Internal Auditor(s). | 0 | 0 Int Eval Team Currency per roundtrip airfare from Int Eval Team Country to Audit Country |
| Internal Audit per diem | 0 days. 0 Int Eval Team Country Junior Internal Auditor(s) and 0 Int Eval Team Country Senior Internal Auditor(s). | 0 | 0 Int Eval Team Currency per diem per person (Int Eval Team Country). |

Figure 11

| Pre-External Audit Factors | Estimate Comments | Cost | Notes |
|---|---|---|---|
| External Lead Auditor project planning | 0 Day(s) to project plan by the External Lead Auditor | 0 | 0 Int Eval Team Currency per day per External Lead Auditor provided by an external firm. 2 Ext Eval Team Currency to 1 Int Eval Team Currency exchange rate. |
| External Lead Auditor on-site | 0 Day(s) on-site pre-audit by the External Lead Auditor | 0 | 0 Int Eval Team Currency per day per External Lead Auditor provided by an external firm. 2 Ext Eval Team Currency to 1 Int Eval Team Currency exchange rate. |
| Internal assistance during on-site activities | 0 Internal Audit Country personnel providing assistance during pre-audit 0 day(s). | 0 | 0 hours per day. 0 Int Eval Team Currency per hour. 1.5 Audit Currency to 1 Int Eval Team Currency exchange rate. |
| External Lead Auditor travel - airfare | One roundtrip from Ext Eval Team Country to Audit Country. | 0 | 0 Int Eval Team Currency roundtrip from Ext Eval Team Country to Audit Country. 0 Ext Eval Team Currency per roundtrip with 2 Ext Eval Team Currency to 1 Int Eval Team Currency exchange rate. |
| External Lead Auditor per diem during on-site | 0 days for pre-External Audit activities. | 0 | 0 Int Eval Team Currency per diem (Ext Eval Team Country). 0 Ext Eval Team Currency per diem with 2 Ext Eval Team Currency to 1 Int Eval Team Currency exchange rate. |

Figure 12

| External Audit Factors | Estimate Comments | Cost | Notes |
|---|---|---|---|
| Management oversight | 0 weeks for management oversight. | 0 | Int Eval Team Country Management = 0 Int Eval Team Currency / hour. 0 hour week. |
| Int Eval Team Country Senior Internal Auditor consulting during External Audit | 0 weeks by 0 Int Eval Team Country Senior Internal Auditor(s) performing External Audit activities. | 0 | Int Eval Team Country Senior Internal Auditor = 0 Int Eval Team Currency / hour. 0 hour week. |
| External Lead Auditor | 0 Week(s) for External Audit | 0 | 0 Int Eval Team Currency per day per External Lead Auditor provided by an external firm. 2 Ext Eval Team Currency to 1 Int Eval Team Currency exchange rate. |
| External Auditor(s) | 0 External Auditor(s) performing External Audit activities. 0 Week(s) for External Audit | 0 | 0 Int Eval Team Currency per day per External Auditor provided by an external firm. 2 Ext Eval Team Currency to 1 Int Eval Team Currency exchange rate. |
| Internal assistance | 0 Internal Audit Country personnel providing assistance during audit. 0 Week(s) for External Audit | 0 | 0 hour week. 0 Int Eval Team Currency per hour. 1.5 Audit Currency to 1 Int Eval Team Currency exchange rate. |
| Int Eval Team Country Senior Internal Auditor consulting travel - airfare | Roundtrip airfare from Int Eval Team Country to Audit Country per person. 0 Int Eval Team Country Senior Internal Auditor(s) performing External Audit activities. | 0 | 0 Int Eval Team Currency per roundtrip airfare from Int Eval Team Country to Audit Country. |
| Int Eval Team Country Senior Internal Auditor consulting per diem | 0 days for 0 Int Eval Team Country Senior Internal Auditor(s) performing External Audit activities | 0 | 0 Int Eval Team Currency per diem per person (Int Eval Team Country). |
| External Auditor and External Lead Auditor travel - airfare | 0 Roundtrip(s) per External Auditor and External Lead Auditor. -1 roundtrip(s) in the middle of the External Audit. One External Lead Auditor and 0 External Auditor(s) performing External Audit activities. | 0 | 0 Int Eval Team Currency roundtrip from Ext Eval Team Country to Audit Country. 0 Ext Eval Team Currency per roundtrip with 2 Ext Eval Team Currency to 1 Int Eval Team Currency exchange rate. |
| External Auditor and External Lead Auditor per diem | 0 weeks. One External Lead Auditor and 0 External Auditor(s) performing External Audit activities. | 0 | 0 Int Eval Team Currency per diem (Ext Eval Team Country). 0 Ext Eval Team Currency per diem with 2 Ext Eval Team Currency to 1 Int Eval Team Currency exchange rate. |

Figure 13

| Post-External Audit Factors | Estimate Comments | Cost | Notes |
|---|---|---|---|
| Certification cost | 0 Int Eval Team Currency Quality Model certification fee. | | 0 0 Int Eval Team Currency Quality Model certification fee. |

Figure 14

| Phase | Cost of Quality Model audit in Audit Country in Int Eval Team Currency | Comments |
|---|---|---|
| Internal Preparation and Pilot | | 0 Int Eval Team Currency |
| Pre-External Audit | | 0 Int Eval Team Currency |
| External Audit | | 0 Int Eval Team Currency |
| Post-External Audit | | 0 Int Eval Team Currency |
| Grand Total | | 0 Int Eval Team Currency |

Figure 15

QUALITY MODEL CERTIFICATION ASSESSMENT COST ESTIMATION AND OPTIMIZATION

BACKGROUND OF THE INVENTION

1. Field of the Invention

The present invention relates to a method and system for determining and optimizing a cost estimation for performing an assessment and certification project.

2. Background of the Invention

The marketplace requires or encourages entities, e.g., corporations, companies, organizations, etc., to assess and certify their processes and procedures against industry standard quality models, such as eSCM, ISO/9000®, CMMI®, ITIL®, COBIT®, etc. Additionally, with some quality models, the entity may be required to perform the assessment and certification process on a regular basis, e.g., every 2-3 years. ISO is a registered trademark of International Organization for Standardization in the United States, other countries, or both. CMMI is a registered trademark of Carnegie Mellon University in the United States, other countries, or both. ITIL is a registered trademark, and a registered community trademark of the Office of Government Commerce, and is registered in the U.S. Patent and Trademark Office. COBIT is a registered trademark of the IT Governance Institute in the United States, other countries, or both.

An expert, or small teams, from a single location may be required to perform an assessment and certification project; however, these assessment and certification projects have grown more complex and involved, which requires large teams. Moreover, these teams can be from a variety of different countries, with different team members involved with different elements of the assessment and certification project. For example, an entity seeking certification may be located in, e.g., India, but may have additional offices in, e.g., Singapore. Moreover, the entity performing the assessment and certification may be located in, e.g., the United States.

Performing these assessment and certification audits may be very expensive, depending on, e.g., the quality model used and the particulars of the entity seeking certification. Accordingly, an entity seeking certification may desire an assessment and certification project cost estimation prior to granting approval to perform the assessment and certification project. However, with each new assessment and certification project and/or with the cost estimation for each new assessment and certification project, an auditor must start anew and size the audit based upon the quality model used and the particulars of the entity seeking certification.

Additionally, the assessment and certification cost estimation is based off of a non-standardized, custom sized analysis for that particular project. Thus, with each new assessment and certification project cost estimation, reviewers may be unfamiliar with the information presentation. Consequently, a review and approval process may require more time and increase costs.

Additionally, as assessment and certification projects have grown more complex and involved, utilizing people or teams from different countries, costs may be incurred in different currencies. As such, a cost estimate for performing an assessment and certification may include estimated costs in a plurality of currencies. Thus, preparing and reviewing a cost estimation for an assessment and certification project may require the preparers and reviewers to work with and analyze data in a plurality of currencies, which may complicate and slow the preparation and approval processes, and increase the costs.

Accordingly, there exists a need in the art to overcome the deficiencies and limitations described hereinabove.

SUMMARY OF THE INVENTION

In a first aspect of the invention, a method comprises determining a standard set of activities to perform an assessment and certification process, and identifying cost elements and cost drivers for each activity of the standard set of activities. Additionally, the method includes determining requirements for a particular assessment and certification project, and determining the cost estimation based upon at least one of the standard set of activities, the cost elements, the cost drivers, and the requirements.

In a second aspect of the invention, a method comprises determining a standard set of activities to perform an assessment and certification process, identifying cost elements and cost drivers for each activity of the standard set of activities, and assigning the major cost elements to an appropriate team. Additionally, the method comprises creating a cost estimation tool for determining a quality model assessment and certification cost estimation based upon at least one of the determined standard set of activities, and the identified and assigned cost elements and cost drivers.

In a further aspect of the invention, a system of optimizing a cost estimation tool for determining a quality model assessment and certification cost estimation, comprises comparing a cost estimation for performing an assessment and certification project for an entity, which is based at least partially upon default assumptions and guidance, with actual incurred costs for the assessment and certification project for the entity, and updating the default assumptions and guidance based upon the comparing.

In an additional aspect of the invention, a computer program product comprises a computer usable medium having readable program code embodied in the medium, the computer program product includes at least one component to determine a standard set of activities to perform an assessment and certification process, identify cost elements and cost drivers for each activity of the standard set of activities, and assign the cost elements and cost drivers to an appropriate team of the determined teams. Additionally, the computer program product includes at least one component to create a cost estimation tool for determining a quality model assessment and certification cost estimation based upon at least one of the determined standard set of activities, and the identified and assigned cost elements and cost drivers.

In a further aspect of the invention, a computer program product comprises a computer usable medium having readable program code embodied in the medium, the computer program product includes at least one component to determine a standard set of activities to perform an assessment and certification process, identify cost elements and cost drivers for each activity of the standard set of activities, and determine requirements for a particular assessment and certification project. Additionally, the computer program product includes at least one component to calculate a cost estimation based upon at least one of the standard set of activities, the cost elements, the cost drivers, and the requirements.

BRIEF DESCRIPTION OF THE DRAWINGS

The present invention is described in the detailed description which follows, in reference to the noted plurality of drawings by way of non-limiting examples of exemplary embodiments of the present invention.

FIGS. 3-7 show embodiments of an exemplary assessment and certification process cost estimation tool;

FIGS. 11-14 show embodiments of an exemplary assessment and certification process cost estimation tool output; and FIG. 15 shows an exemplary assessment and certification process cost estimation summary.

DETAILED DESCRIPTION OF THE INVENTION

Figure 1:
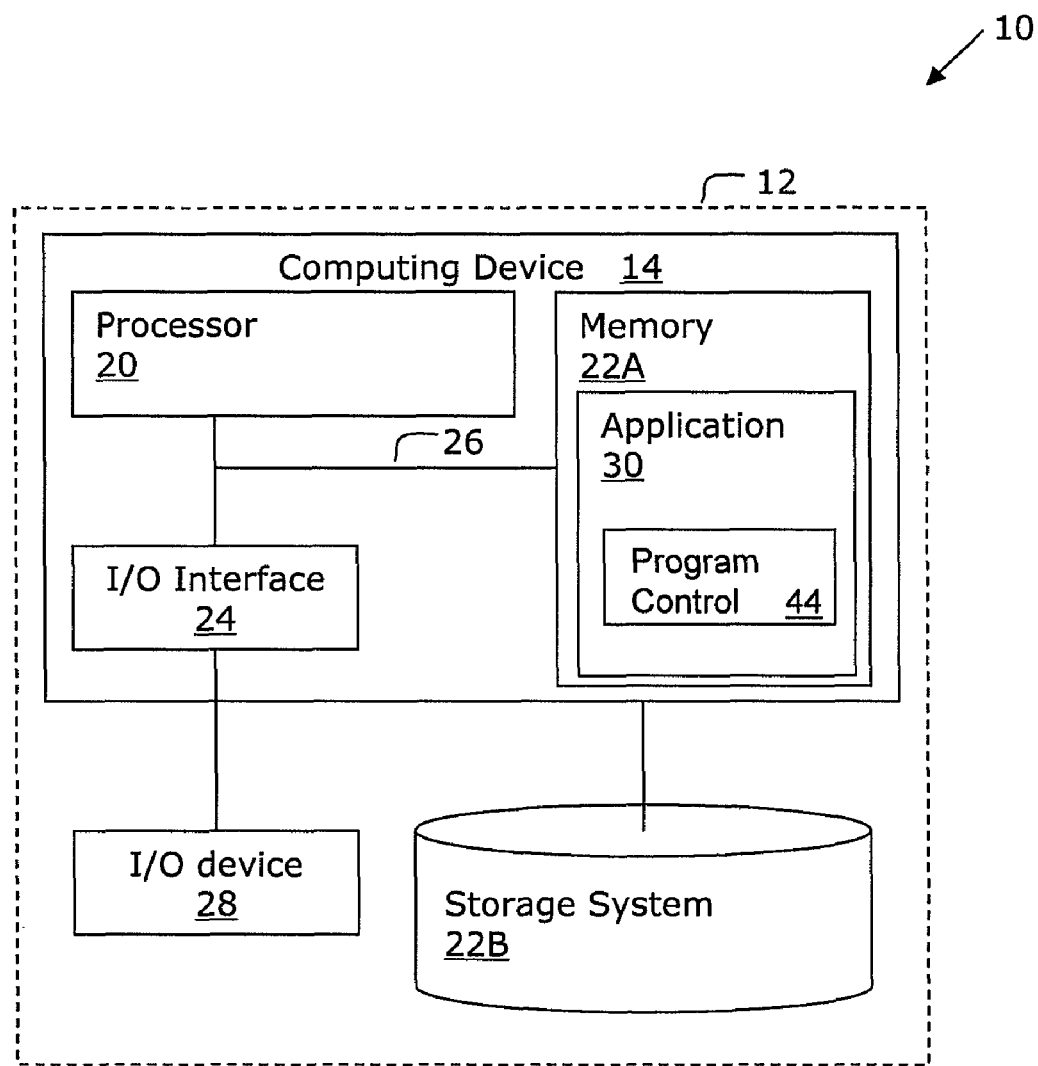
FIG. 1 shows an illustrative environment for managing the processes of the invention.

The invention relates to a method and system for determining and optimizing a cost estimation for performing an assessment and certification project. According to an aspect of the invention, the assessment and certification process activities are standardized to perform cost analyses and develop repeatable cost-by-effort calculations. Additionally, the invention provides an approach and documentation to allow a lead evaluator to document assessment and certification project requirements and assumptions in the system based on a standard set of activities and teams. Moreover, the assessment and certification process activities and/or the cost estimation tool can be optimized by implementing the invention.

Furthermore, by implementing an aspect of the invention, a lead evaluator may generate presentation materials to gain management approval and funding for an assessment and certification project. Moreover, as the assessment and certification process is based on a standardized format, managers may be more familiar with the presented information, thus facilitating a smoother, quicker, and consequently, less costly review and approval process.

Utilizing the present invention, it is possible to reduce the time to size an assessment and certification project from weeks to hours, since a standard set of activities that may be required to perform assessment and certification for any quality model may be determined and a standard set of cost drivers for each activity may be specified. Additionally, utilizing the present invention, it is possible to reduce the time to understand and reach a decision on an assessment and certification project, as presentation to management of an assessment and certification project cost can be standardized. Furthermore, it is possible to present the costs for the assessment and certification in the currency of the country responsible for funding the project regardless of the currency in which the costs will be incurred. Moreover, it is possible to optimize the use of resources in the assessment and certification process by performing what-if scenarios, e.g., varying assumptions of how and by whom the activities will be performed.

As discussed above, the present invention relates to a system and method for determining a cost estimation for performing an assessment and certification according to standard quality models. In embodiments, these quality models may include, for example, eSCM, ISO/9000, CMMI, ITIL, COBIT, etc.

The eSourcing Capability Model for Service Providers (eSCM-SP) helps IT-enabled sourcing service providers appraise and improve their ability to provide high quality sourcing services and provides a mechanism to be differentiated from the competition. Prospective clients can evaluate service providers based on their eSCM-SP level of certification and Practice Satisfaction Profile. Additionally, the eSourcing Capability Model for Client Organizations (eSCM-CL) provides a package of best practices for clients who use sourcing services, helping to evaluate the return on investment for all phases of the sourcing lifecycle. This enables buyers of sourcing services to evaluate how well they manage their sourcing purchases, whether they have been provided through in-house shared service centers, captive centers, outsourcing firms or offshore firms. The services purchased may range from assistance with back-office operations, engineering design, IT, payroll, telesupport and telemarketing, or strategic processes that directly affect a company's bottom line.

ISO/9000 is a family of standards for quality management systems. ISO/9000 is maintained by the International Organization for Standardization (ISO) and is administered by accreditation and certification bodies. For a manufacturer, some of the requirements in ISO/9001 (which is one of the standards in the ISO/9000 family) would include: a set of procedures that cover all key processes in the business; monitoring manufacturing processes to ensure they are producing quality product; keeping proper records; checking outgoing product for defects, with appropriate corrective action where necessary; regularly reviewing individual processes and the quality system itself for effectiveness; and facilitating continual improvement.

A company or organization that has been independently audited and certified to be in conformance with ISO/9001 may publicly state that it is "ISO/9001 certified" or "ISO/9001 registered." Certification to an ISO/9000 standard does not guarantee the compliance (and therefore the quality) of end products and services; rather, it certifies that consistent business processes are being applied. Although the standards originated in manufacturing, they are now employed across a wide range of other types of organizations, including colleges and universities. A "product", in ISO vocabulary, can mean a physical object, services, or software.

CAPABILITY MATURITY MODEL® Integration (CMMI) is a process improvement approach that provides organizations with the essential elements of effective processes. CAPABILITY MATURITY MODEL is a registered trademark of Carnegie Mellon University in the United States, other countries, or both. CMMI should be adapted to each individual company, therefore companies are not "certified." A company is appraised, e.g., with an appraisal method like Standard CMMI Appraisal Method for Process Improvement (SCAMPI), at a certain level of CMMI. The results of such an appraisal can be published if released by the appraised organization.

The Information Technology Infrastructure Library (ITIL) is a framework of best practice approaches intended to facilitate the delivery of high quality information technology (IT) services. ITIL outlines an extensive set of management procedures that are intended to support businesses in achieving both high financial quality and value in IT operations. These procedures are supplier-independent and have been developed to provide guidance across the breadth of IT infrastructure, development, and operations.

The Control Objectives for Information and related Technology (COBIT) is a set of best practices (framework) for information technology management created by the Information Systems Audit and Control Association (ISACA), and the IT Governance Institute (ITGI) in 1992. COBIT provides managers, auditors, and IT users with a set of generally accepted measures, indicators, processes and best practices to assist them in maximizing the benefits derived through the use of information technology and developing appropriate IT governance and control in a company.

According to an aspect of the invention, assessment and certification project costs may fall into one of four phases: Internal Preparation and Pilot; Pre-External Audit; External Audit; and Post-External Audit. In embodiments, the Internal Preparation and Pilot phase may include preparing for the Pre-External Audit phase. This may include determining what documents may be required and determining what interviews may be required, along with who may participate in those interviews. Additionally, schedules for performing the audit activities may be determined.

In embodiments, the Pre-External Audit phase may be thought of as a trial run audit conducted internally prior to the external audit. Entities seeking certification may conduct a pre-external (internal) audit in order to gain insight on how the External Audit phase may result. Moreover, after performing an internal audit, an entity may decide, for example, that they no longer would like to perform an external assessment and certification audit, that they are not yet ready to perform an assessment and certification external audit, or that they would like to refine the external assessment and certification audit.

In embodiments, the External Audit phase is the official assessment and certification of the entity. The External Audit phase may be completed by an outside organization. Additionally, internal employees (e.g., employees of the entity being certified), e.g., auditors, lead auditors, assistants, may assist in conducting the External Audit phase. The Post-External Audit may include such activities as reviewing the external audit results.

System Environment

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises an application 30 having a program control 44, which makes computing device 14 operable to perform the processes described herein, such as, for example, a cost estimation determination and optimization for performing an assessment and certification project. The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. The external I/O device/resource 28 may be keyboards, displays, pointing devices, etc.

In general, the processor 20 executes computer program code (via the program control 44), which is stored in memory 22A and/or storage system 22B. The computer program code is executable to provide the processes of the invention. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Flow Diagrams

The steps of the flow diagrams described herein may be implemented in the environment of FIG. 1. The flow diagrams may equally represent high-level block diagrams of the invention. The steps of the flow diagrams may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Initial Setup

According to an aspect of the invention, prior to a determination of a cost estimation for conducting an assessment and certification for a particular project, an initial setup of the assessment and certification cost estimation system may be performed. According to an aspect of the invention, in performing the initial setup, an evaluator may determine the basic parameters for sizing, and thus for determining a cost estimate, of an assessment and certification process.

Thus, according to an aspect of the invention, for each phase of the assessment and certification project (e.g., Internal Preparation and Pilot phase, Pre-External Audit phase, External Audit phase and Post-External Audit phase), a standard set of activities to be performed for conducting an assessment and certification project for any of the quality models may be identified. That is, even though the quality models may be different (e.g., ISO/9000, eSCM, CMMI, COBIT, ITIL, etc.), the quality models may still require the same activities, with the same cost elements and cost drivers. However, while the different quality models may require the same activities, and a majority of the cost elements and the cost drivers may remain the same, there may be cost elements and/or cost drivers that are specific to particular quality models.

Additionally, according to an aspect of the invention, the following may be identified in an initial setup: (i) teams to perform each of these activities; (ii) cost elements and cost drivers for those activities; (iii) an appropriate team for each cost element and cost driver; (iv) team make-up and country of origin parameters; and (v) default assumptions and guidance for the assessment and certification process. Thus, the initial setup may be thought of as determining all of the activities, cost drivers and cost elements that may be encountered in performing an assessment and certification audit, regardless of the specifics of the entity subject to the assessment and certification. However, the particular type of quality model (e.g., ISO/9000, eSCM, CMMI, COBIT, ITIL, etc.) may affect which cost drivers and/or cost elements are encountered in performing an assessment and certification audit.

Figure 2:
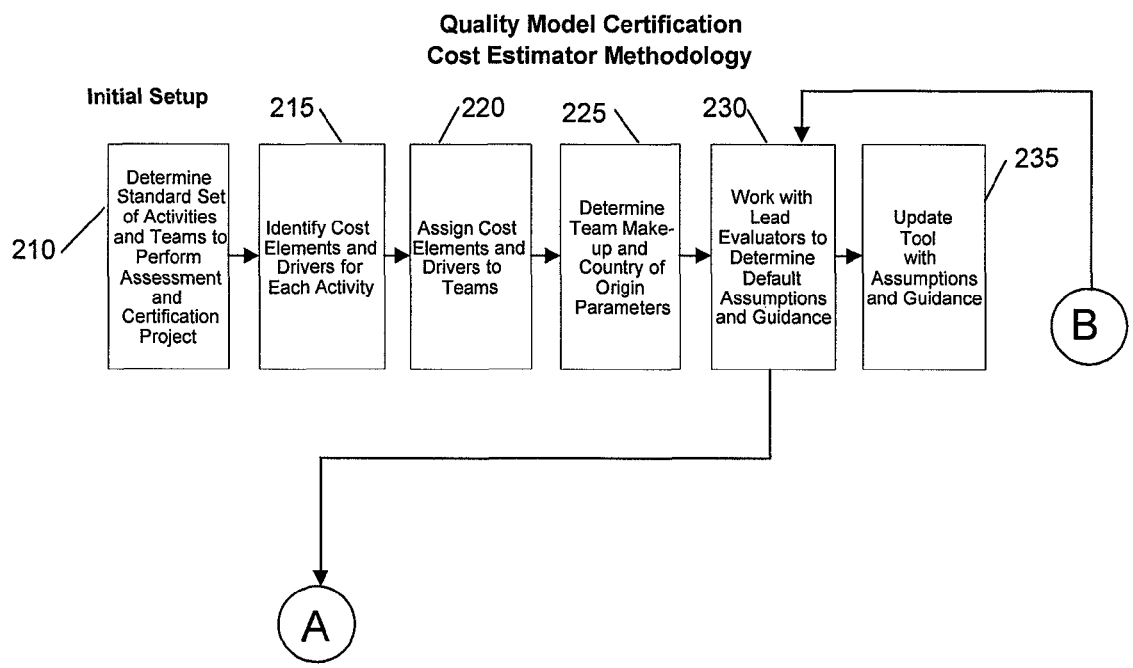
FIG. 2 show an exemplary flow chart for practicing aspects of the invention.

FIG. 2 shows a flow chart for performing the initial setup of the assessment and certification cost estimation tool. Referring to FIG. 2, at step 210, a standard set of assessment and certification project activities and teams to perform the assessment and certification project activities may be determined. At step 215, the major cost elements and cost drivers for each activity may be identified. At step 220, the major cost elements and drivers may be assigned to the appropriate teams. At step 225, team make-up and country of origin parameters may be determined. At step 230, lead evaluators may determine default assumptions and guidance. As discussed further below, connection A indicates that the determined default assumptions and guidance may be used in an individual assessment and certification project and connection B indicates that results obtained in an individual assessment and certification project may be used to update the default assumptions and guidance. At step 235, the assessment and certification cost estimation tool may be updated with the determined assumptions and guidance.

While FIG. 2 shows the steps in a particular order, it should be understood that the invention contemplates that these steps may be performed in a different order. For example, steps 220 and 225 may be performed in the opposite order than that shown in FIG. 2.

Tool Overview

According to an aspect of the invention, an assessment and certification audit cost estimation tool may initially be configured. This tool may provide the lead evaluator with the ability to determine and document assessment and certification project requirements and assumptions based on a standard set of activities and teams. According to a further aspect of the invention, the cost estimation tool may provide support for varying assessment team sizes of various skill levels (e.g., lead evaluators, junior evaluators, support staff and assistants). Additionally, the cost estimation tool provides support for labor resources from multiple countries. In one exemplary embodiment, this tool may be in the form of a spreadsheet. In a further exemplary embodiment, the tool may be in the form of a series of equations.

FIGS. 3-7 show an exemplary embodiment of an assessment and certification cost estimation tool according to an aspect of the invention. This is an illustrative example and should not be considered a limiting embodiment. As shown in FIGS. 3-7, the identified standard set of activities' cost drivers and cost elements are listed and assigned to the appropriate teams. Additionally, as shown in FIGS. 3-7, the team make-ups and country of origin parameters are identified. This provides a consistent and standard cost estimation process for assessment and certification projects.

Each of FIGS. 3-7 show a spreadsheet with three columns: an "Assumptions" column; an "Inputs" column; and a "Comments" column. The Assumptions column is a list of the factors that may be accounted for in determining an assessment and certification cost estimation. The Inputs column provides a user input for each of the listed assumptions, as discussed further below. Additionally, the Comments column lists comments that pertain to each of the listed assumptions. In embodiments, by relating the Inputs column with the Comments column, the Comments column may automatically update upon a user entering inputs into the Inputs column. Additionally, while FIGS. 3-7 list individual assumptions, (and the related inputs and comments) as described below, the invention contemplates that other individual assumptions (and the related inputs and comments) may be included in the invention.

FIG. 3 shows an exemplary embodiment of the listed assumptions for the General Assumptions. In embodiments, the General Assumptions may include amongst other assumptions: countries involved; the location of the assessment and certification audit; the currency exchange rates; the type of audit; labor rates; travel costs; the location of the Junior and Senior Internal Auditors; the local currency of the Junior and Senior Internal Auditors; the type of audit to be performed; the location/country of the audit; the local currency of the location of the audit; the exchange rate of the audit country; the location of the External Auditor and External Lead Auditor; the local currency of the External Auditor and External Lead Auditor; the exchange rate of the External Auditor and External Lead Auditor; the titles of the Junior Internal Evaluator, the Senior Internal Evaluator, the External Auditor, and the External Lead Auditor; the internal audit country labor costs; the costs of the Junior Internal Evaluator, the Senior Internal Evaluator, and the Senior Internal Auditor Management oversight; the costs for the External Auditor and the External Lead Auditor; Junior Internal Evaluator and the Senior Internal Evaluator travel/airfare expenses and per diems; External Auditor and the External Lead Auditor travel/roundtrip airfare in the local currency and per diems; and an audit certification fee, amongst other contemplated possibilities.

It should be understood that the costs of the evaluators, auditors and others may be hourly, daily, weekly, etc. Additionally, as the internal audit is conducted in the entity's location, the internal auditors may not incur travel costs and per diems. However, in embodiments, there may be situations where an internal employee (e.g., manager, evaluator, auditor, support staff) would incur travel costs and per diems. For example, consider the situation where the entity is located in a different region (e.g., Bangalore, India) of the entity's country than the internal employee (e.g., Agra, India). In this situation, the internal evaluator may still be required to travel, and thus, may incur travel costs and a per diem.

FIG. 4 shows an exemplary embodiment of the listed Internal Audit activities, which may be used to size the internal audit. In embodiments, the Internal Audit Activities data may include the size and duration of the internal audit. For example, in embodiments, these activities may include: a duration of consulting/implementation assistance; a duration of planning for an internal audit; and a duration of the assessment for the internal audit. In embodiments, planning for an internal audit may include: determining who are the key players from an entity seeking certification that need to be interviewed; determining which documents may be needed; and arranging a schedule for conducting the internal audit, amongst other contemplated possibilities.

FIG. 5 shows an exemplary embodiment of the listed Internal Audit Activity Labor Assumptions, which may be used to validate the Internal Audit Activity Labor Assumptions. In embodiments, the Internal Audit Activity Labor Assumptions data may include team make-up and hours worked per week. More specifically, the data may include Internal Evaluator and Senior Evaluator Labor assumptions and Site Labor assumptions. In embodiments, the Internal Evaluator and Senior Evaluator Labor assumptions, for example, may include: a duration of additional time for the Internal Evaluator and the Internal Senior Evaluator for the internal audit; hours per week for the Internal Evaluator and the Internal Senior Evaluator; hours per week for local management support for internal audit activities; a number of Internal Evaluators performing internal audit activities; and a number of Internal Senior Evaluators performing internal audit activities, amongst other contemplated possibilities. In embodiments, the Site Labor assumptions, for example, may include: a number of local internal personnel providing assistance during the internal audit; and hours per week for the local internal personnel, amongst other contemplated possibilities.

FIG. 6 shows an exemplary embodiment of the listed External Audit Activities, which may be used to size the external audit. In embodiments, the External Audit Activity data may include data reflective of the duration of the external audit. For example, in embodiments, the data may include: a duration to project plan by the External Lead Evaluator; a duration of on-site pre-audit by the External Lead Evaluator; and a duration of local Internal Senior Evaluator consultation during the External Audit phase, amongst other contemplated possibilities.

FIG. 7 shows an exemplary embodiment of the listed External Audit Activity Labor Assumptions, which may be used to validate the External Audit Activity Labor Assumptions. In embodiments, the External Audit Activity Labor Assumptions data may include, for example, team make-up and hours worked per week. More specifically, the data may include Internal Senior Evaluator Labor Assumptions, Site Labor Assumptions, and External Evaluator and External Lead Evaluator Labor assumptions. In embodiments, the Internal Senior Evaluator Labor Assumptions data may include, for example: a duration of Internal Senior Evaluator consulting during the External Audit; hours per week for the Internal Senior Evaluator; hours per week for local management support for the External Audit activities; and a number of Internal Senior Evaluators, amongst other contemplated possibilities. In embodiments, the Site Labor Assumption data may include, for example: a number of internal personnel providing assistance during the Pre-External Audit phase; hours per week for the internal personnel providing assistance during the Pre-External Audit phase; a number of internal personnel providing assistance during the External audit; and hours per week for the internal personnel providing assistance during the External Audit phase, amongst other contemplated possibilities.

Thus, according to an aspect of the invention, the above described embodiment of the cost estimation tool may be set-up by determining a standard set of activities (and the related cost elements and drivers) that are to be performed regardless of the quality model and the specifics of the entity being certified.

According to a further aspect of the invention, a determination and optimization of a cost estimation for performing an assessment and certification audit may be performed using a series of equations. For example, the costs incurred in an assessment and certification project may occur in different countries. In this example, the entity that is being certified may be in one country and the external auditing entity may be in another country. Thus, in an exemplary embodiment, the cost estimation total of an assessment and certification project may be the sum of all country costs, and be expressed as:

$$\text{Evaluation Cost} = \sum_{i=1}^{n} (Country^i \text{ Cost}) \quad (1)$$

Additionally, in an exemplary embodiment, each country cost may be expressed according to the equation:

Country Cost=Mgt Cost+IntEv Cost+IntSupt Cost+IntMisc Cost+ExtEv Cost+ExtSupt Cost+ExtMisc Cost+Cert Cost  (2)

where:
 Management=Mgt;
 Internal Evaluation Evaluator=IntEv;
 Internal Evaluation Support Personnel=IntSupt;
 Internal Evaluation Miscellaneous=IntMisc;
 External Evaluation Evaluator=ExtEv;
 External Evaluation Support Personnel=ExtSupt;
 External Evaluation Miscellaneous=ExtMisc; and
 Certification=Cert.

Therefore, according to an aspect of the invention, an evaluator may estimate the country costs for a particular country involved in the assessment and certification project using equation (2). Thus, using equation (2), the total country estimated cost may be the sum of the management estimated costs, the internal evaluation evaluator estimated costs, the internal evaluation support personnel estimated costs, the internal evaluation miscellaneous estimated costs, the external evaluation evaluator estimated costs, the external evaluation support personnel estimated costs, the external evaluation miscellaneous estimated costs, and the certification fee estimated costs.

Additionally, for example, management cost may be expressed by the below equation.

$$\text{Management Cost} = \sum_{i=1}^{n} (Mgt^i \text{ Hours} * Mgt^i \text{ Hourly Cost}) \quad (3)$$

Using equation (3), the management costs may be estimated by summing the product of the management hours and the management hourly rate, for each management employee.

Furthermore, for example, Internal Evaluation Evaluator cost may be expressed by the below equation.

$$\text{Internal Evaluation Elevator Cost} = IntEv \text{ Fee} + \sum_{i=1}^{n} (IntEv^i \text{ Hours} * IntEv^i \text{ Hourly Cost} + IntEv^i \text{ Travel Cost}) \quad (4)$$

Using equation (4), the internal evaluation evaluator estimated costs may be determined by adding the internal evaluation evaluator fee and the summation of the internal evaluator travel costs and the product of the internal evaluator hours and the internal evaluator hourly rate, for each internal evaluator.

Additionally, for example, Internal Evaluation Support Personnel cost may be expressed by the below equation.

$$\text{Internal Evaluation Support Personnel Cost} = \sum_{i=1}^{n} (IntSupt^i \text{ Hours} * IntSupt^i \text{ Hourly Cost} + IntSupt^i \text{ Travel Cost}) \quad (5)$$

Using equation (5), the internal evaluation support estimated costs may be determined by summing the internal support travel costs and the product of the internal support hours and the internal support hourly rate, for each internal support employee.

Additionally, for example, Internal Evaluation Miscellaneous cost may be expressed by the below equation.

$$\text{Internal Evaluation Miscellaneous Cost} = \sum_{i=1}^{n} (IntMisc^i \text{ Cost}) \quad (6)$$

Using equation (6), the internal miscellaneous estimated costs may be determined by summing all of the internal miscellaneous costs.

Furthermore, for example, External Evaluation Evaluator cost may be expressed by the below equation.

$$\text{External Evaluation Evaluator Cost} = \sum_{i=1}^{n} (ExtFirm^i \text{ Fee}) + \sum_{i=1}^{n} (ExtEv^i \text{ Hours} * ExtEv^i \text{ Travel Cost}) \quad (7)$$

where External Evaluation Firm=ExtFirm. Using equation (7), the external evaluation evaluator estimated costs may be determined by adding the summation of external evaluation firm fees for each external evaluator firm and the summation of the external evaluator travel costs and the product of the external evaluator hours and the external evaluator hourly rate, for each external evaluator.

Furthermore, for example, External Evaluation Support Personnel cost may be expressed by the below equation.

$$\text{External Evaluation Support Personnel Cost} = \sum_{i=1}^{n} (ExtSupt^i \text{ Hours } ExtSupt^i \text{ Hourly Cost} + ExtSupt^i \text{ Travel Cost}) \quad (8)$$

Using equation (8), the external evaluation support estimated costs may be determined by summing the external support travel costs and the product of the external support hours and the external support hourly rate, for each external support employee.

Furthermore, for example, External Evaluation Miscellaneous cost may be expressed by the below equation.

$$\text{External Evaluation Miscellaneous Cost} = \sum_{i=1}^{n} (ExtMisc^i \text{ Cost}) \quad (9)$$

Using equation (9), the external miscellaneous estimated costs may be determined by summing all of the external miscellaneous costs.

As is shown by the above equations (1)-(9), the invention may identify and account for a standard set of activities for performing an assessment and certification process, the teams to perform those activities, and the major cost elements and drivers for those teams. Additionally, as the estimated costs are grouped by country, as shown by equation (1), the invention may account for the country of origin parameters. Moreover, lead evaluators may determine default assumptions and guidance, in accordance with the present invention.

Additionally, according to an aspect of the invention, in embodiments, an external evaluator firm may contract for a set fee instead of, or in combination with, a per external evaluator fee structure. Additionally, it should be noted that a support person may be from the site being evaluated or an internal evaluator overseeing the external evaluation.

Individual Assessment and Certification Project

According to a further aspect of the invention, once the initial setup has been performed, a cost estimation for a particular assessment and certification project may be performed. Initially, the requirements for the assessment and certification project may be determined and information may be gathered (e.g., type of audit, audit location) to calculate a cost estimation. Additionally, in embodiments, the gathered information may be entered into the cost estimation tool to calculate the cost estimation.

Once the cost estimation for performing the assessment and certification project has been determined, a management overview of the assessment and certification project may be created in accordance with the processes of the invention. This management overview provides a standardized overview, which may reduce the time required for managers and/or decision-makers to understand and reach a decision on the assessment and certification project. That is, as the cost estimation for performing the assessment and certification project has been determined according to a standardized format, managers and/or decision-makers will be able to interpret and analyze the presented cost estimation in an expedited manner, thus reducing costs. Once management approval for the assessment and certification process has been obtained, the assessment and certification process may be performed.

Additionally, after the assessment and certification process has been performed, a comparison may be made between the cost estimation for performing the assessment and certification project and the actual incurred costs of the assessment and certification project in accordance with the processes of the invention. Through this closed-loop feedback system (the comparison of the estimated costs and the actual incurred costs), a lead evaluator may update the assumptions and guidance used for the initial setup of the cost estimation tool. This allows the default assumptions and guidance to be refined and adjusted based upon actual assessment and certification projects, which may provide more accuracy to future cost estimations.

Figure 8:
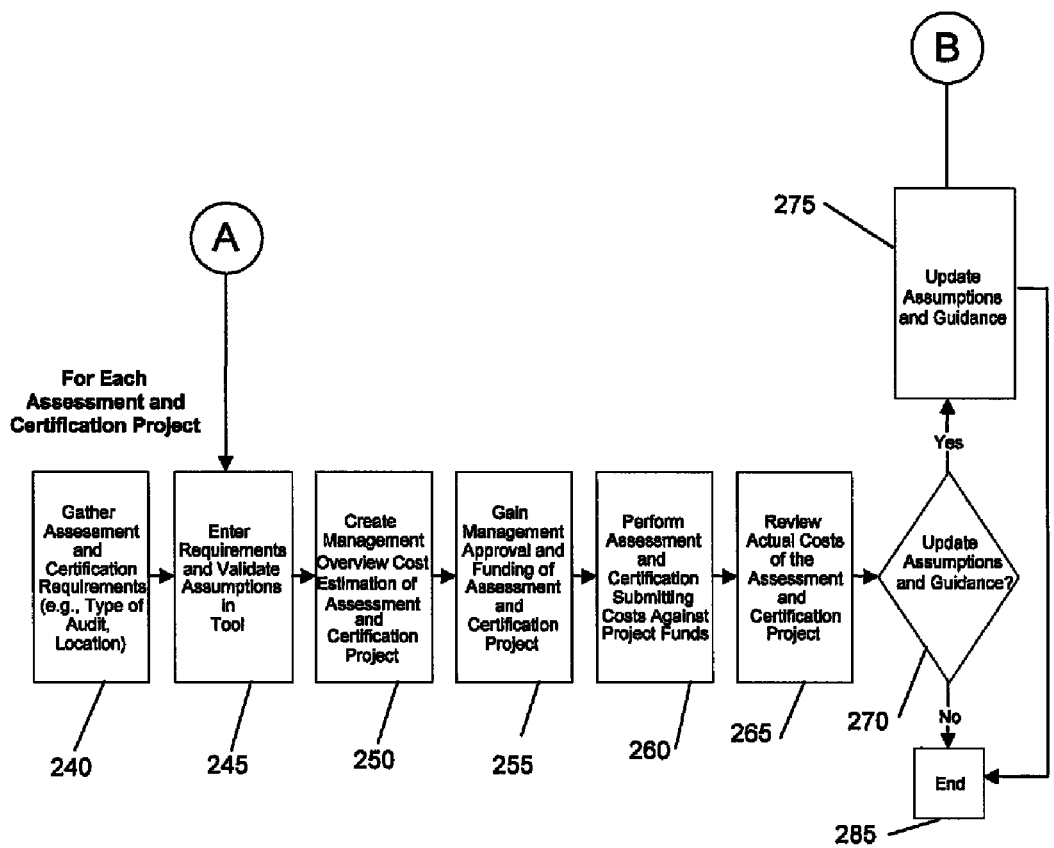
FIG. 8 shows an exemplary flow chart for practicing aspects of the invention.

FIG. 8 shows an exemplary flow chart for performing an individual assessment and certification project according to an aspect of the invention. Referring to FIG. 8, at step 240, assessment and certification requirements specific to the current project may be gathered. At step 245, the requirements may be entered into the cost estimation tool, and the assumptions may be validated. As indicated by connection A, the requirements may be determined at step 230 of FIG. 2. At step 250, the program control may create a management overview cost estimation of the assessment and certification project. At step 255, management approval and funding of the assessment and certification project may be obtained. At step 260, the assessment and certification project may be performed, submitting costs against the project funds. At step 265, the actual costs of the assessment and certification project may be reviewed. At step 270, a determination may be made as to whether to update and refine the assumptions and guidance used for the initial setup of the cost estimation tool. If, at step 270, a decision is made to update the assumptions and guidance, then the process may proceed to step 275. At step 275, the guidance and assumptions may be updated. These updated guidance and assumptions may be used at step 230 of FIG. 2 during future cost estimations (as indicated by connection B). If, at step 270, a decision is made to not update the assumptions and guidance, then the process may proceed to step 285. At step 285, the process ends.

Tool Input Process

According to an aspect of the invention, the data may be gathered and input to the cost estimation tool. As discussed above, inputs into the cost estimation tool may be logically grouped into five categories: General Assumptions, Internal Audit Activities, Internal Audit Activity Labor Assumptions, External Audit Activities, and External Audit Activity Labor Assumptions.

Figure 9:
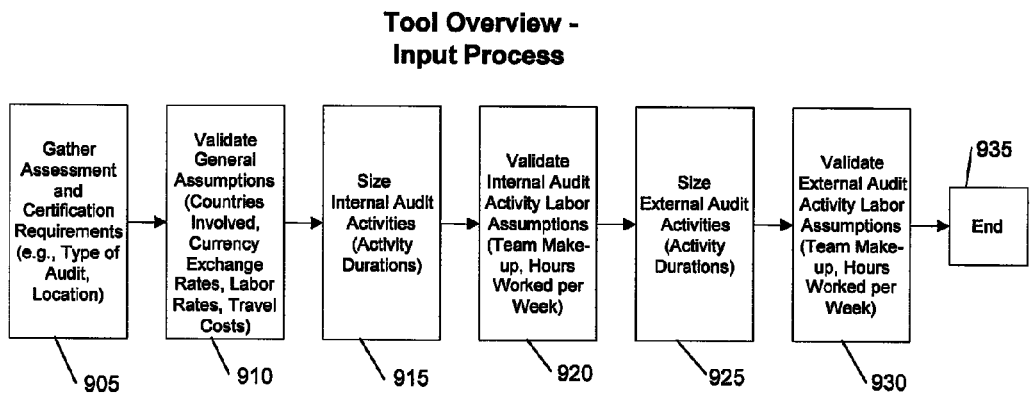
FIG. 9 shows an exemplary flow chart for practicing aspects of the invention.

FIG. 9 shows a flow chart for an input process of the cost estimation tool according to an exemplary embodiment of the invention. At step 905, the assessment and certification requirements specific to the current project may be gathered. At step 910, the General Assumptions (e.g., countries involved, currency, exchange rates, labor rates and travel costs) may be validated. At step 915, the Internal Audit Activities may be sized (e.g., the activity durations). At step 920, the Internal Audit Activity Labor Assumptions may be validated (e.g., team make-up, hours worked per week). At step 925, the External Audit Activity may be sized. At step 930, the External Audit Activity Labor Assumptions may be validated. At step 935, the process ends.

Some of the General Assumptions, the Internal Audit Activity Labor Assumptions, and the External Audit Activity Labor Assumptions (e.g., the currency exchange rates, labor rates, travel costs) may vary during the preparation of the assessment and certification cost estimation. Thus, according to an aspect of the invention, the assumptions may be validated to ensure that they are still accurate.

According to a further aspect of the invention, in determining a cost estimate for performing an assessment and certification project, the cost elements and/or the cost drivers for the standard activities may be weighted, depending on which quality model is used to perform the assessment and certification process. That is, each quality model (e.g., ISO/9000, eSCM, CMMI, COBIT, ITIL, etc.) may have a different emphasis on different cost elements and/or different cost drivers for the required activities.

For example, a base ISO/9000 assessment covers a single location and single service. Thus, according to an aspect of the invention, during the requirements gathering, if it were determined that: a) a single service is provided from two locations, then the increased weighting may be applied to travel, and assessment team efforts may result in higher estimated travel costs; or b) a single location provides two services, then the increased weighting may be applied to the duration of activities, quantity of documentation reviewed, and number of interviews to be performed, and may result in higher estimated personnel costs. Thus, while each quality model may have the same cost elements and cost drivers, the particular quality model used may affect a weighting, and consequently an emphasis, of the different cost elements and/or cost drivers on the estimated cost for performing the assessment and certification project.

In a further example, an eSCM audit may require a large amount of document review and less interviews, while an ITIL audit may require less document review and a larger amount of interviews. Thus, if the eSCM quality model were to be used, the cost elements and/or the cost drivers associated with document review may be weighted more heavily than the cost elements and/or the cost drivers associated with the interviews. In contrast, if the ITIL quality model were to be used, an opposite weighting may be applied creating an emphasis on the interviews. Additionally, in embodiments, the cost elements and/or the cost drivers may be weighted based upon location (e.g., central vs. remote vs. home office) depending on the quality model used.

Based on the assessment and certification requirements gathered, the costs developed in steps 915 and 925 may be adjusted based on weighting factors associated with various cost elements and/or cost drivers. Moreover, depending on the quality models (eSCM, ISO/9000, CMMI, ITIL, COBIT, etc), the weighting applied to the cost elements and/or cost drivers in steps 915 and 925 may be different.

According to an aspect of the invention, utilizing the spreadsheet cost estimation tool embodiment, a lead evaluator may determine and input data into the inputs column of the cost estimation tool. As described above, by relating the Inputs column with the Comments column, entering data into the Inputs column may automatically update the Comments column with related pertinent information.

Additionally, according to a further aspect of the invention, utilizing the equations cost estimation tool embodiment, a lead evaluator may determine and input data into the equations.

Tool Output—Costs Estimation

According to a further aspect of the invention, once the data has been input into the tool, the tool may determine an estimation of the costs for the assessment and certification project. In embodiments, the tool may separately determine a cost estimate for the Internal Preparation and Pilot activities, the Pre-External Audit activities, the External activities and the Post-External activities. In further embodiments, the cost estimation tool may separately determine a cost estimation for each involved country. Additionally, according to the invention, the cost estimates may be summed to arrive at a total cost estimation for an assessment and certification project.

Figure 10:
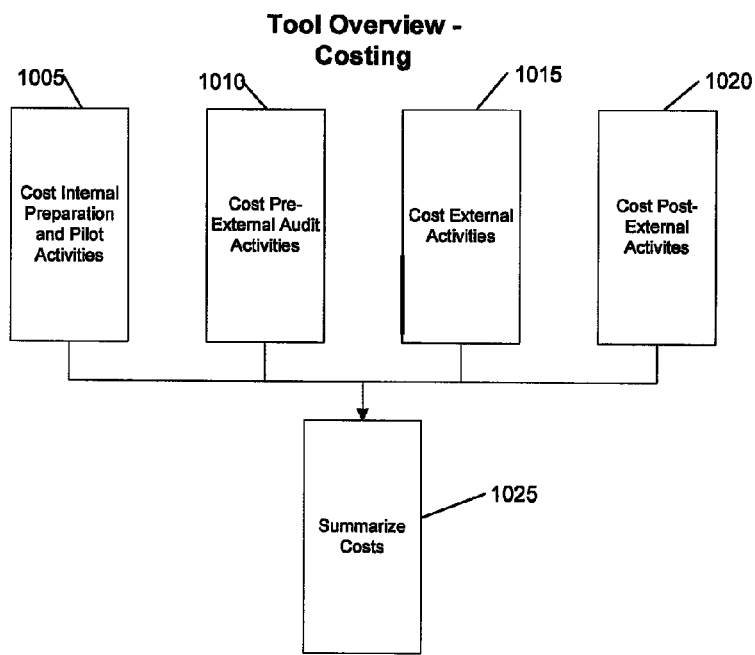
FIG. 10 shows an exemplary flow chart for practicing aspects of the invention.

FIG. 10 shows a flow chart of an exemplary embodiment of the costing structure according to an aspect of the invention. At step 1005, the program control may determine an estimated cost of the Internal Preparation and Pilot activities. At step 1010, the program control may determine an estimated cost of the Pre-External (or Internal) Audit activities. At step 1015, the program control may determine an estimated cost of the External Audit activities. At step 1020, the program control may determine an estimated cost of the Post-External Audit activities. At step 1025, the program control may summarize and total the estimated costs determined in steps 1005, 1010, 1015 and 1020.

FIGS. 11-14 show an exemplary embodiment of an assessment and certification cost estimation tool output in the form of a spreadsheet. This is an illustrative example and should not be considered a limiting embodiment. In each of FIGS. 11-14, there may be columns for the "Individual Cost Factors", "Estimate Comments", "Estimated Cost" and "Notes". Additionally, by relating the Inputs column of FIGS. 3-7 to the Comments column, the Estimated Cost column and the Notes column of FIGS. 11-14, each of the Comments column, the Estimated Cost column and the Notes column may automatically update upon inputting, or altering, the inputs in the Input columns of FIGS. 3-7. Furthermore, as shown in FIGS. 11-14, the Estimated Costs are mapped directly to a predefined assessment and certification plan template used by the lead evaluators. Additionally, while FIGS. 11-14 list individual cost factors, as described below, the invention contemplates that other individual cost factors may be included.

FIG. 11 shows an example of the assessment and certification cost estimation tool output for the Internal Preparation and Pilot phase of the assessment and certification project. In embodiments, the individual cost factors for the Internal Preparation and Pilot phase of the assessment and certification project may include: management oversight; Junior and Senior Internal Auditor Internal Audit labor; airfare and per diems; internal assistance during the internal audit; internal consulting/implementation assistance; and internal consulting/implementation assistance travel/airfare and per diems, amongst other contemplated possibilities.

FIG. 12 shows an example of the assessment and certification cost estimation tool output for the Pre-External Audit phase of the assessment and certification project. In embodiments, the individual cost factors for the Pre-External Audit phase of the assessment and certification project may include: External Lead Audit project planning; External Lead Auditor on-site; Internal assistance during on-site activities; and External Lead Auditor travel/airfare and per diem during on-site activities, amongst other contemplated possibilities.

FIG. 13 shows an example of the assessment and certification tool output for the External Audit phase of the assessment and certification project. In embodiments, the individual cost factors for the External Audit phase of the assessment and certification project may include: management oversight; Senior Internal Auditor consulting during the External Audit; Senior Internal Auditor travel/airfare and per diem; External Lead Auditor; other External Auditors; External Auditor travel/airfare and per diem; and internal assistance, amongst other contemplated possibilities.

FIG. 14 shows an example of the assessment and certification cost estimation tool output for the Post-External Audit phase of the assessment and certification project. In embodiments, the individual cost factors for the Post-External Audit phase of the assessment and certification project may include the fee for the certification. Additionally, this phase of the project may include individual cost factors for the review of the External Audit.

FIG. 15 shows an exemplary embodiment of an overall cost summary. The overall cost summary, in embodiments, may include the total estimated costs for each phase of the audit and a summation of those costs indicating a grand total cost estimation for performing an assessment and certification audit.

Optimization

In a further aspect of the invention, the assessment and certification tool may be optimized to provide more accurate assessment and certification project cost estimations. By sizing and performing the assessment and certification projects in a consistent and similar manner, the method provides for feedback to optimize the cost estimation process. Moreover, as the sizing and performing of the assessment and certification projects may be done in a consistent and similar manner, the feedback received for a particular assessment and certification project for a particular entity may be utilized to optimize future cost estimations not only for that particular entity, but other unrelated entities.

For example, in embodiments, the assessment and certification cost estimation tool may be optimized by reevaluating the assumptions and guidance used to determine a cost estimation for an assessment and certification project, after the actual costs for that particular assessment and certification project have been incurred. According to an aspect of the invention, by comparing the actual incurred costs with the estimated costs, lead evaluators may adjust some of the assumptions and guidance that were determined in the initial setup.

Moreover, these updates/refinements of the assumptions and guidance may be performed to optimize the cost estimation tool, for example, "locally", e.g., just for future assessment and certification projects of the particular entity, or "globally", e.g., for all future assessment and certification projects. For example, as an entity may be required to perform an assessment and certification every two to three years in order to maintain their certification, the reevaluation and optimization of the guidance and assumptions may be used "locally" to produce a more accurate cost estimation when the entity performs a next assessment and certification.

Additionally, reevaluating the guidance and assumptions may optimize the cost estimation tool "globally" for use with other entities. That is, as more assessment and certification cost estimations are performed, the degree of correspondence of the estimated costs and the actual incurred costs may be used to update the assumptions and guidance for the cost estimation tool for all future assessment and certification projects.

Furthermore, as more assessment and certification cost estimations are performed on different entities, other cost drivers, weightings and/or activities may be determined or discovered that affect the overall cost estimation. Thus, according to a further aspect of the invention, the cost estimation tool is flexible enough that it may be adjusted to account for these other cost drivers, weightings and/or activities.

According to a further aspect of the invention, a cost estimation for a particular assessment and certification project may be optimized. In embodiments, once an estimated cost for an assessment and certification project has been determined, an evaluator may conduct "what if" scenarios. More specifically, an evaluator may vary some of the parameters, and observe the impact of those assumptions on the resulting cost estimation. For example, after determining a cost estimation for an assessment and certification project, an evaluator may decide that the costs are too high. The evaluator may observe that the high costs are originating from a particular cost element (e.g., the number of Internal Evaluators assisting in the External Audit). Thus, according to an aspect of the invention, the evaluator may vary some of the parameters (e.g., reduce the number of Internal Evaluators assisting in the External Audit and increase the number of Internal assistants assisting in the External Audit) and observe the effect upon the cost estimation. Through this process, the evaluator may further optimize the cost estimation by finding efficiencies.

Additionally, in embodiments, an evaluator may optimize the assessment and certification project within a range of costs. For example, after determining a cost estimation for performing an assessment and certification, an evaluator may very the parameters to alter the structure of the assessment and certification project (e.g., more Internal Evaluators and less Internal assistants), while maintaining the estimated cost at a same amount, or within a range of about the same amount. Through this process, the evaluator may further optimize the assessment and certification project, while maintaining the estimated cost at, or about, the same amount.

While the invention has been described in terms of embodiments, those of skill in the art will recognize that the invention can be practiced with modifications and in the spirit and scope of the appended claims.

What is claimed is:

1. A method comprising:

identifying a plurality of phases for an assessment and certification process for an identified plurality of quality models, the plurality of phases comprising: an internal preparation and pilot phase, a pre-external audit phase, an external audit phase and a post-external audit phase;

determining a first same standard set of activities to be performed for conducting the internal preparation and pilot phase for the identified plurality of quality models, wherein the plurality of quality models use the first same standard set of activities for conducting the internal preparation and pilot phase;

determining a second same standard set of activities to be performed for conducting the pre-external audit phase for the identified plurality of quality models, wherein the plurality of quality models use the second same standard set of activities for conducting the pre-external audit phase;

determining a third same standard set of activities to be performed for conducting the external audit phase for the identified plurality of quality models, wherein the plurality of quality models use the third same standard set of activities for conducting the external audit phase;

determining a fourth same standard set of activities to be performed for conducting the post-external audit phase for the identified plurality of quality models, wherein the plurality of quality models use the fourth same standard set of activities for conducting the post-external audit phase;

identifying a first team to perform the first same standard set of activities to be performed for conducting the internal preparation and pilot phase;

identifying a second team to perform the second same standard set of activities to be performed for conducting the pre-external audit phase;

identifying a third team to perform the third same standard set of activities to be performed for conducting the external audit phase;

identifying a fourth team to perform the fourth same standard set of activities to be performed for conducting the post-external audit phase;

identifying first cost elements and first cost drivers to be assigned to the first team conducting the internal preparation and pilot phase;

identifying second cost elements and second cost drivers to be assigned to the second team conducting the pre-external audit phase;

identifying third cost elements and third cost drivers to be assigned to the third team conducting the external audit phase;

identifying fourth cost elements and fourth cost drivers to be assigned to the fourth team conducting the post-external audit phase;

determining requirements for a particular assessment and certification project; and calculating a cost estimation from at least one of the first through fourth standard set of activities, the first through fourth cost elements, the first through fourth cost drivers, and the requirements, using a processor.

2. The method of claim 1, further comprising providing data reflective of the determined requirements for the particular assessment and certification project into a cost estimation tool, wherein the data is provided into the cost estimation tool into one category of categories.

3. The method of claim 2, wherein the categories comprise at least one of general assumptions, internal audit activity, internal audit activity labor assumptions, external audit activity, and external audit activity labor assumptions.

4. The method of claim 3, further comprising validating at least one of the general assumptions, the internal audit activity labor assumptions, and the external audit activity labor assumptions.

5. The method of claim 1, wherein the determined first through fourth same standard set of activities to be performed for conducting the assessment and certification process for the identified plurality of quality models are also determined to be standard regardless of specifics of an entity being certified.

6. The method of claim 5, wherein the identified plurality of quality models comprise eSourcing Capability Model for Service Providers (eSCM), International Organization for Standardization (ISO/9000), Capability Maturity Model Integration (CMMI), Information Technology Infrastructure Library (ITIL), and Control Objectives for Information and related Technology (COBIT).

7. The method of claim 6, wherein the determined requirements for the particular assessment and certification project are specific to one quality model of the identified plurality of quality models.

8. The method of claim 1, further comprising creating a standardized management overview of the cost estimation for the particular assessment and certification project.

9. The method of claim 8, wherein the standardized management overview of the cost estimation comprises cost estimations for each of the internal preparation and pilot phase, the pre-external audit phase, the external audit phase, and the post-external audit phase.

10. The method of claim 1, further comprising:
determining the first through fourth team make-ups to perform the first through fourth standard set of activities;
assigning the first through fourth cost elements and the first through fourth cost drivers to appropriate teams of the determined first through fourth team make-ups; and
determining country of origin parameters.

11. The method of claim 10, wherein:
the determining the country of origin parameters comprises determining applicable currencies and exchange rates; and
the calculating the cost estimation comprises calculating the cost estimation in a single currency, notwithstanding the assessment and certification project cost estimation anticipating costs incurred in multiple currencies.

12. The method of claim 1, further comprising optimizing the cost estimation, by:
varying at least one of the requirements for the particular assessment and certification project;
calculating a new cost estimation based upon the at least one varied requirement; and comparing the cost estimation with the new cost estimation.

13. The method of claim 1, further comprising optimizing the cost estimation, by altering at least one parameter of the particular assessment and certification project, while maintaining a resulting new cost estimation, based upon the at least one altered parameter, at, or about, a same amount as the cost estimation.

14. The method of claim 1, further comprising:
at least one of:
assigning a cost element weighting to at least one of the first through fourth cost elements; and
assigning a cost driver weighting to at least one of the first through fourth cost drivers based upon a type of assessment and certification quality model; and
determining the cost estimation with at least one of the cost element weighting and the cost driver weighting.

15. The method of claim 1, wherein a quality model comprises one of eSourcing Capability Model for Service Providers (eSCM), International Organization for Standardization (ISO/9000), Capability Maturity Model Integration (CMMI), Information Technology Infrastructure Library (ITIL), and Control Objectives for Information and related Technology (COBIT).

16. The method of claim 1, wherein a service provider at least one of creates, maintains, deploys and supports a computer infrastructure that performs the steps of claim 1.

17. The method of claim 1, wherein steps of claim 1 are provided by a service provider on at least one of a subscription, advertising, and fee basis.

18. A computer program product comprising a tangible computer usable medium having readable program code embodied in the tangible medium, the computer program product includes at least one component to:
identify a plurality of phases for an assessment and certification process for an identified plurality of quality models, the plurality of phases comprising: an internal preparation and pilot phase, a pre-external audit phase, an external audit phase and a post-external audit phase;
determine a first same standard set of activities to be performed for conducting the internal preparation and pilot phase for the identified plurality of quality models, wherein the plurality of quality models use the first same standard set of activities for conducting the internal preparation and pilot phase;
determine a second same standard set of activities to be performed for conducting the pre-external audit phase for the identified plurality of quality models, wherein the plurality of quality models use the second same standard set of activities for conducting the pre-external audit phase;
determine a third same standard set of activities to be performed for conducting the external audit phase for the identified plurality of quality models, wherein the plurality of quality models use the third same standard set of activities for conducting the external audit phase;
determine a fourth same standard set of activities to be performed for conducting the post-external audit phase for the identified plurality of quality models, wherein the plurality of quality models use the fourth same standard set of activities for conducting the post-external audit phase;
identify a first team to perform the first same standard set of activities to be performed for conducting the internal preparation and pilot phase;
identify a second team to perform the second same standard set of activities to be performed for conducting the pre-external audit phase;
identify a third team to perform the third same standard set of activities to be performed for conducting the external audit phase;
identify a fourth team to perform the fourth same standard set of activities to be performed for conducting the post-external audit phase; identify first cost elements and first cost drivers to be assigned to the first team conducting the internal preparation and pilot phase;
identify second cost elements and second cost drivers to be assigned to the second team conducting the pre-external audit phase;
identify third cost elements and third cost drivers to be assigned to the third team conducting the external audit phase;
identify fourth cost elements and fourth cost drivers to be assigned to the fourth team conducting the post-external audit phase;
determine requirements for a particular assessment and certification project; and
calculate a cost estimation from at least one of the first through fourth standard set of activities, the first through fourth cost elements, the first through fourth cost drivers, and the requirements, using a processor.

19. The computer program product of claim 18, further comprising at least one component to:
determine the first through fourth teams to perform the first through fourth standard set of activities; and
calculate the cost estimation based upon the determined first through fourth team teams.

* * * * *